US010922546B2

(12) United States Patent
Encz et al.

(10) Patent No.: US 10,922,546 B2
(45) Date of Patent: Feb. 16, 2021

(54) REAL-TIME LOCATION TAGGING

(71) Applicant: PLANGRID Inc., San Francisco, CA (US)

(72) Inventors: Benjamin Denis Encz, Berkeley, CA (US); Ronald Steven Martin, San Francisco, CA (US); Arjun A Nayini, San Francisco, CA (US)

(73) Assignee: PLANGRID INC., San Francisco, CA (US)

( * ) Notice: Subject to any disclaimer, the term of this patent is extended or adjusted under 35 U.S.C. 154(b) by 101 days.

(21) Appl. No.: 16/102,011

(22) Filed: Aug. 13, 2018

(65) Prior Publication Data

US 2020/0050864 A1 Feb. 13, 2020

(51) Int. Cl.
| | |
|---|---|
| *G06K 9/00* | (2006.01) |
| *G06K 9/78* | (2006.01) |
| *G06T 7/80* | (2017.01) |
| *G06F 16/583* | (2019.01) |

(52) U.S. Cl.
CPC ..... *G06K 9/00691* (2013.01); *G06F 16/5838* (2019.01); *G06K 9/78* (2013.01); *G06T 7/80* (2017.01)

(58) Field of Classification Search
CPC ........ G06K 9/00691; G06K 9/78; G06T 7/80; G06F 16/5838
See application file for complete search history.

(56) References Cited

U.S. PATENT DOCUMENTS

| | | | | |
|---|---|---|---|---|
| 9,230,223 | B2* | 1/2016 | Cohen | G06Q 30/0631 |
| 2010/0086221 | A1* | 4/2010 | Stankiewicz | G06Q 30/0206 382/224 |
| 2012/0066275 | A1* | 3/2012 | Gerstner | G06F 16/444 707/825 |
| 2013/0230253 | A1* | 9/2013 | Stankiewicz | G06K 9/4671 382/195 |
| 2013/0297690 | A1* | 11/2013 | Lucero | G06Q 10/101 709/204 |
| 2014/0270482 | A1* | 9/2014 | Chakraborty | G06K 9/00677 382/154 |
| 2015/0094047 | A1* | 4/2015 | Jung | H04W 4/16 455/415 |
| 2015/0153172 | A1* | 6/2015 | Starns | G01C 11/02 382/106 |
| 2016/0125734 | A1* | 5/2016 | Stenneth | G08G 1/0112 340/935 |
| 2018/0143756 | A1* | 5/2018 | Mildrew | G06F 3/0482 |

* cited by examiner

*Primary Examiner* — Md K Talukder
(74) *Attorney, Agent, or Firm* — Gates & Cooper LLP

(57) ABSTRACT

Techniques for real-time location tagging are disclosed. A camera-enabled device presents an image of a physical space currently being captured by the camera-enabled device. Responsive to detecting user input while the image of the physical space is being captured by the camera-enabled device, the camera-enabled device tags a location in a plan of the physical space with information based at least in part on the user input.

18 Claims, 10 Drawing Sheets

REAL-TIME LOCATION TAGGING

TECHNICAL FIELD

The present disclosure relates to tagging. In particular, the present disclosure relates to location tagging.

BACKGROUND

In construction, architecture, facilities management, and other endeavors dealing with physical spaces, a plan is a diagram that represents a particular physical space. A plan may represent a top-down view, horizontal view, three-quarters view, or some other view of the physical space. A plan may include characters, numbers, and/or symbols that provide detailed information about the physical space. For example, a plan may include: measurements; labels associated with particular areas within the physical space (e.g., "office" or "kitchen"); topographical contour lines; symbols representing physical features such as doors, furniture, appliances, stairs, pipes, wires, etc.; or any other kind of character, number, symbol, or combination thereof. Architectural drawings, including floorplans, are one kind of plan.

In some cases, a plan serves as a reference for people working in the physical space that the plan represents. For example, during construction, workers may consult a plan to determine the size and placement of materials to be installed. In facilities management, workers may consult a plan to locate physical features that require maintenance or repair. An interior designer may reference a plan to determine the expected locations of furniture, appliances, etc. Many different kinds of workers may use plans in many different ways. Historically, workers have printed out physical copies of plans. While using a plan, a worker may add markup to the physical copy of the plan. It may be difficult for a worker to determine a correspondence between a location in the physical space and a corresponding location on the plan. In addition, the markup is available only to a worker who has access to the physical copy of the plan.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. REAL-TIME LOCATION TAGGING
   3.1 CAPTURING CAMERA DATA AND INTERACTING WITH EXISTING TAG INFORMATION
   3.2 TAGGING A PHYSICAL LOCATION
   3.3 TAGGING WITH IMAGE RECOGNITION
4. ILLUSTRATIVE EXAMPLES
5. MISCELLANEOUS; EXTENSIONS
6. HARDWARE OVERVIEW
7. COMPUTER NETWORKS AND CLOUD NETWORKS

1. General Overview

One or more embodiments include techniques for real-time location tagging. A camera-enabled device presents an image of a physical space currently being captured by the camera-enabled device. Responsive to detecting user input while the image of the physical space is being captured by the camera-enabled device, the camera-enabled device tags a location in a plan of the physical space with information based at least in part on the user input.

One or more embodiments described in this Specification and/or recited in the claims may not be included in this General Overview section.

2. Architectural Overview

Figure 1:
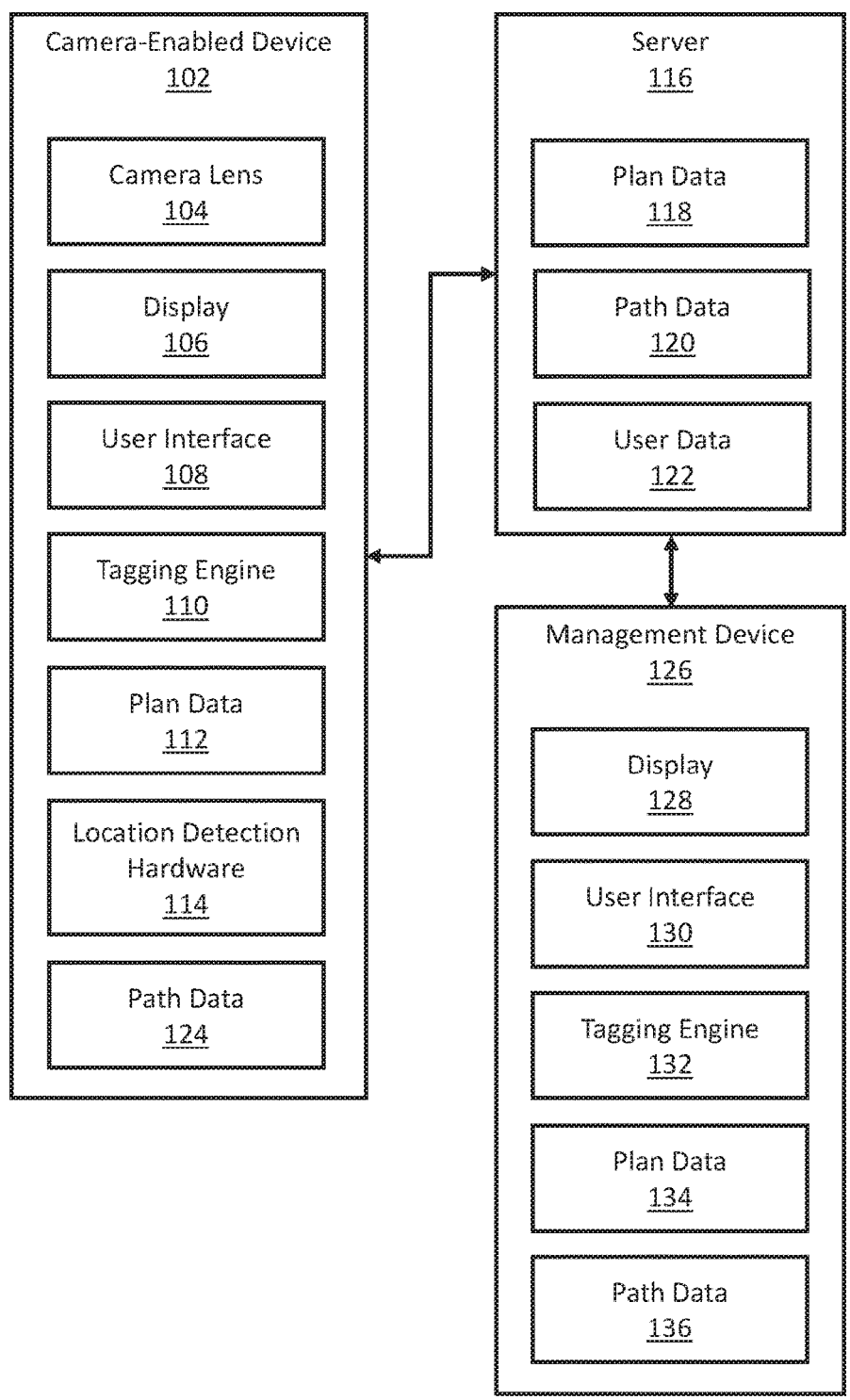
FIG. 1 illustrates a system in accordance with one or more embodiments.

FIG. 1 illustrates a system 100 in accordance with one or more embodiments. As illustrated in FIG. 1, system 100 includes a camera-enabled device 102, a server 116, a management device 126, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, a camera-enabled device 102 is a device that is capable of capturing photographs and/or videos through a camera lens 104. The camera-enabled device 102 may be a dedicated camera or a multi-purpose device that includes a camera lens 104. Examples of camera-enabled devices include, but are not limited to: digital single-lens reflex (DSLR) cameras; camera-enabled smartphones; camera-enabled digital tablets; and camera-enabled laptop computers. A camera-enabled device 102 may be mounted to an article of clothing, such as a work vest or helmet. A camera-enabled device 102 may include a display 106, on which a user views an image that is being captured by the camera lens. The display 106 may be a touchscreen display. In an embodiment, camera-enabled device 102 is configured to overlay one or more graphical elements such as text, icons, markers, or any other kind of other symbol, or combination thereof, onto the display 106. Each particular graphical element overlaid onto the display 106 may supply information to a user and/or correspond to a touchscreen control.

In an embodiment, the camera-enabled device 102 includes a user interface 108. The user interface 108 is a set of controls through which a user directs various functions of the camera-enabled device 102. As noted above, the display 106 may be a touchscreen. The touchscreen may display one or more touch-sensitive areas and/or graphical elements, corresponding to functions of the camera-enabled device 102. When a user selects or 'taps' a touch-sensitive area or graphical element, the camera-enabled device performs the corresponding function. Alternatively or in addition, the user interface 108 may include one or more other user interface controls such as buttons, switches, a keyboard, a cursor control such as a mouse, or any other kind of user interface control or combination thereof.

In an embodiment, the camera-enabled device 102 includes a tagging engine 110. The tagging engine 110 includes software and/or hardware configured to perform operations described herein for real-time location tagging. To perform real-time location tagging, the tagging engine may access plan data 112. The plan data 112 includes data associated with locations in a physical space. In an embodiment, the plan data 112 includes a digital representation of a plan corresponding to the physical space. In addition, the plan data 112 may include metadata associated with physical features in the physical space. Specifically, the metadata may be derived from architectural data and indicate the locations and/or other information relating to various physical features in the physical space. For example, the physical space may include multiple doors. In this example, the metadata may indicate the specific locations of the doors as represented by the plan. As another example, the metadata may indicate the material of a physical features, measurements associated with the physical feature, any other kind of information associated with a physical feature, or any combination thereof. In an embodiment, the plan data 112 includes tag information associated with one or more locations in the physical space, supplied by a user of the camera-enabled device 102 as described herein.

Some operations described herein may be performed, in part, by leveraging one or more application programming interfaces (APIs) supplied by an operating system of the camera-enabled device. For example, the camera-enabled device may be a mobile device manufactured by Apple Inc., such as an iPhone® or iPad®, running a version of iOS. Versions of iOS include APIs for determining the location of a device. In addition, versions of iOS support augmented reality features developed using ARKit.

In an embodiment, the plan data 112 may be stored in any kind of storage unit and/or device (e.g., a file system, database, collection of tables, or any other storage mechanism) for storing data. Further, the plan data 112 may be stored across multiple different storage units and/or devices. The multiple different storage units and/or devices may or may not be of the same type or located at the same physical site. Further, the plan data 112 may be stored on the camera-enabled device 102. Alternatively or additionally, the plan data 112 may be stored on a device separate from the camera-enabled device 102. A data repository storing the plan data 112 may be communicatively coupled to the camera-enabled device 102 via a direct connection or via a network.

In an embodiment, the camera-enabled device 102 includes location detection hardware 114. The location detection hardware 114 is capable of determining a location of the camera-enabled device. The location detection hardware 114 may include global positioning system (GPS) hardware. Alternatively or in addition, the location detection hardware 114 may include Bluetooth hardware and/or software configured to detect the camera-enabled device's 102 location relative to one or more Bluetooth beacons positioned in a physical space. Many different kinds of location detection hardware exist. In an embodiment, the location detection hardware 114 is configured to determine both the camera-enabled device's 102 location and its orientation relative to a particular frame of reference (e.g., magnetic north, 'sheet' or 'page' north in a plan, or some other frame of reference).

In an embodiment, the camera-enabled device 102 includes path data 124. The path data 124 stores information about a path traveled in the physical space, by the camera-enabled device 102, during a particular period of time (a.k.a. 'session'). For example, the path data 124 may include timestamps corresponding to times when the camera-enabled device 102 was at different locations. In addition, the path data 124 may cross-reference tag information, in the plan data 112, that was gathered during a particular session. The path data 124 may include data for multiple sessions, i.e., multiple paths traveled by the camera-enabled device 102 at different times.

In an embodiment, the system 100 includes a server 116. The server 116 includes plan data 118. As described above with respect to the plan data 112 of the camera-enabled device 102, the plan data 118 includes data associated with locations in a physical space. The server 116 may include plan data 118 corresponding to multiple physical spaces. For example, the server 116 may include plan data 118 for all physical spaces managed by a particular management company (e.g., different buildings and/or different floors in a particular building). The camera-enabled device 102 and server 116 may be configured to sync plan data, or a subset thereof, to and/or from the camera-enabled device 102.

In an embodiment, the server 116 includes path data 120. As described above with respect to the path data 124 of the camera-enabled device 102, the path data 120 stores information about one or more paths traveled by the camera-enabled device 102 in one or more physical spaces. The path data 120 may include data from multiple sessions, captured by a single camera-enabled device 102 or multiple camera-enabled devices. The camera-enabled device 102 and server 116 may be configured to sync path data, or a subset thereof, to and/or from the camera-enabled device 102.

In an embodiment, the server includes user data 122. The user data 122 includes information that is specific to individual users, or groups thereof, of the plan data 118. Specifically, the user data 122 may include logins, credentials, and/or other data associated with particular users. In an embodiment, the server 116 stores path data 120 in association with particular users and/or in association with particular devices. Alternatively or in addition, one or more users may have credentials that provide access to only a subset of the plan data 118. For example, if the plan data 118 includes data for multiple physical spaces, one user may have access to data for all of the physical spaces, while another user may have access to data for one or more physical spaces but not all of them.

In an embodiment, the server 116 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In an embodiment, the system 100 includes a management device 126. The management device 126 includes hardware and/or software configured to perform operations described herein for managing work to be done a physical space. The camera-enabled device 102 may itself be a management device 126. Alternatively or in addition, a separate device may be a management device 126. For example, some management functions may be performed at a desktop computer. In an embodiment, the management device 126 includes a display 128 and a user interface 130. In addition, the management device 126 may include a tagging engine 132. The tagging engine 132 may include hardware and/or software for performing operations described herein for tagging locations and/or modifying tag information. Alternatively or in addition, the management device 126 may include plan data 134. The management device 126 and server 116 may be configured to sync plan data, or a subset thereof, to and/or from the management device 126. Alternatively or in addition, the management device 126 may include path data 136. The management device and server 116 may be configured to sync path data, or a subset thereof, to and/or from the management device 126.

Figure 2:
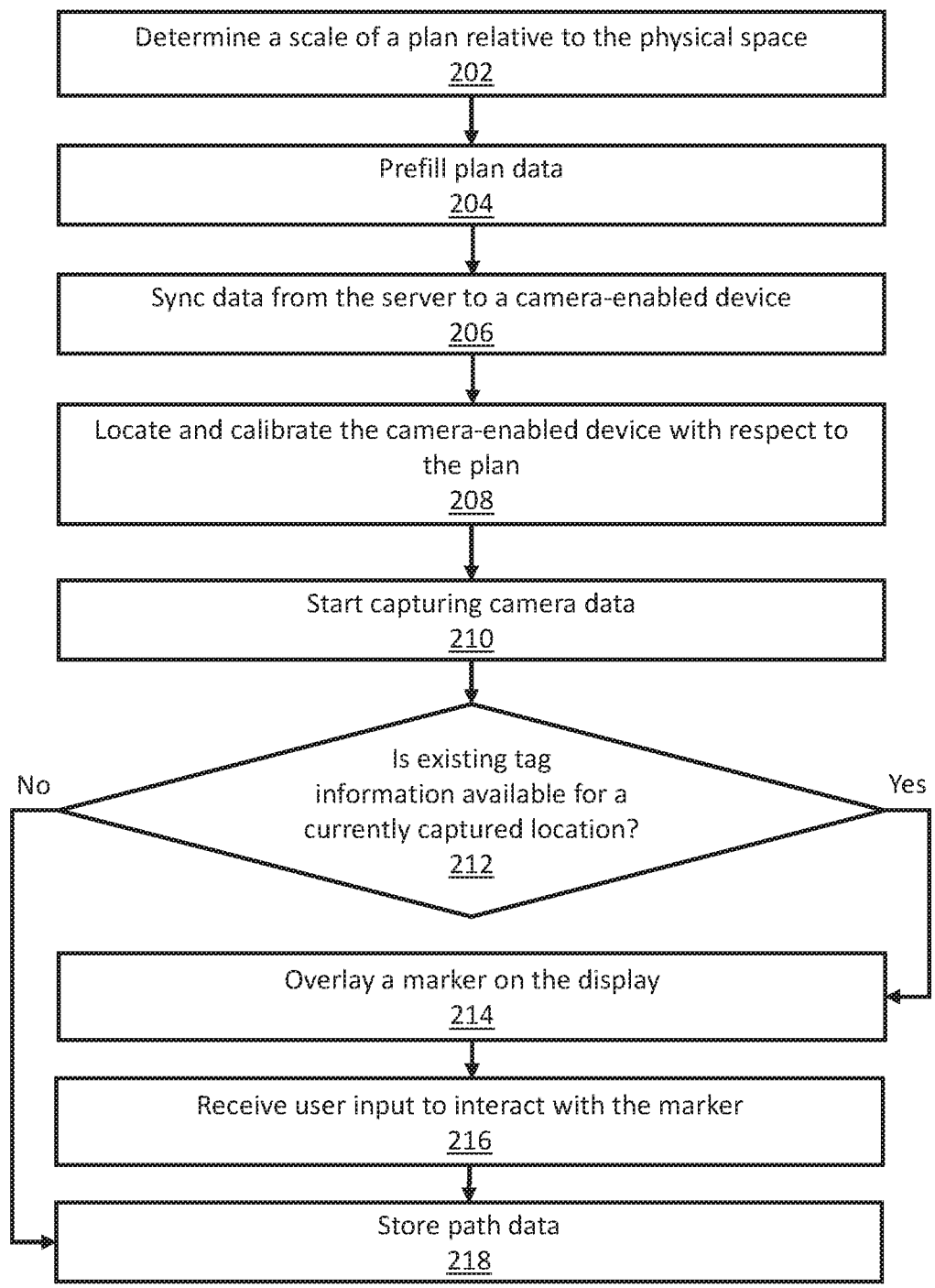
FIGS. 2-4 illustrate sets of operations for real-time location tagging in accordance with one or more embodiments.

3. Real-Time Location Tagging 3.1 Capturing Camera Data and Interacting with Existing Tag Information FIG. 2 illustrates an example set of operations for real-time location tagging in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a server (e.g., server 116 of FIG. 1) determines a scale of a plan, representing a physical space, relative to the physical space (Operation 202). The scale corresponds to a ratio between measurement units in the physical space (e.g., inches, feet, yards, meters, or some other unit or combination thereof used to measure distances in the physical space) and measurement units in the plan (e.g., inches, centimeters, pixels, or some other unit or combination thereof used to measure distances in the plan). Measurement units in the plan maybe significantly smaller than the measurement units in the physical space. As described below, as a camera-enabled device moves through the physical space, it may use the scale to translate from locations and/or paths in the physical space to locations and/or paths on the plan.

In an embodiment, the server prefills plan data (Operation 204) associated with the plan. Specifically, the server may prefill the plan data with metadata that is already available for the physical space. As discussed above, the metadata may be derived from architectural data and indicate the locations and/or other information relating to various physical features in the physical space. Alternatively or in addition, the plan data may include tag information previously stored as described herein. Alternatively or in addition, the plan metadata may include information about a predetermined location to be used for calibrating the camera-enabled device 102 as discussed below.

In an embodiment, the server syncs plan data to a camera-enabled device (e.g. camera-enabled device 102 of FIG. 1) (Operation 206). The plan data synced to the camera-enabled device may be only a subset of plan data stored by the server. For example, if the server stores plan data for multiple physical spaces, the plan data synced to the camera-enabled device may be for one or more particular physical spaces. The plan data synced to the camera-enabled device may include a visual representation of the physical space, plan metadata, prior tag information, information about a scale of the plan relative to the physical space, or any other kind of information, or combination thereof, associated with the physical space.

In an embodiment, a camera-enabled device locates and calibrates itself with respect to the plan (Operation 208). Specifically, the camera-enabled device determines its location in the physical space and maps that location to a location on the plan. In addition, the camera-enabled device may calibrate its orientation with respect to the plan. To calibrate its orientation, the camera-enabled device may prompt a user (e.g., via a display or audio output of the camera-enabled device) to point the camera-enabled device in a particular direction (e.g., magnetic north, 'sheet' or 'page' north with respect to the plan, or some other predetermined direction). Alternatively or in addition, the camera-enabled device may prompt the user holding the camera-enabled device to stand in a particular location, such as a particular doorway or other predetermined landmark in the physical space. Alternatively or in addition, the user may orient the camera-enabled device so that it captures, via its camera lens, a preestablished visual anchor. For example, the visual anchor may be a barcode, such as a Quick Response (QR) code, situated at a predetermined location and orientation in the physical space. When the camera-enabled device detects the visual anchor, it is able to discern both the location and orientation of the camera-enabled device. Additional calibration may not be needed when calibrating the camera-enabled device with respect to a visual anchor.

In an embodiment, the camera-enabled device starts capturing camera data (Operation 210). The camera data may include photographs and/or video. The camera-enabled device may store the camera data in persistent storage, as a recording to be used later. Alternatively, the camera-enabled device may store the camera data in temporary storage, to be used for tagging but not stored as a recording. In an embodiment, as the camera-enabled device captures camera data, it presents the camera data on a display.

In an embodiment, the camera-enabled device determines whether existing tag information is available for a currently captured location (Operation 212). A currently captured location is a location that is currently visible to the camera lens. To determine whether existing tag information is available for the currently captured location, the camera-enabled device may cross-reference the camera-enabled device's current location and orientation with tag information stored in the plan data. If the camera-enabled device's current location and orientation correspond to a location and orientation associated with existing tag information, then existing tag information is available for the currently captured location. In an embodiment, a currently captured location corresponds to a particular physical feature, in the physical space, that is currently visible to the camera lens.

In an embodiment, if there is tag information available for a currently captured location, then the camera-enabled device overlays a marker on the display (Operation 214). The position of the marker on the display may correspond, visually, to the particular location for which the tag information is available. The marker may include text, an icon, or some other symbol or combination thereof, indicating that tag information is available for the location shown on the display. If tag information is available for multiple locations shown on the display, the camera-enabled device may overlay multiple markers on the display.

In an embodiment, the camera-enabled device receives user input to interact with a marker on the display (Operation 216). For example, if the display is a touchscreen, a user may select or 'tap' the marker on the display. Upon detecting user input to interact with the marker, the camera-enabled device may present tag information via the display (for example, via a pop-up window or heads-up display). In addition, the camera-enabled device may present a user interface, via the display, that allows the user to add to existing tag information, modify existing tag information, and/or delete existing tag information. Thus, in an embodiment, the camera-enabled device displays a real-time, interactive record of tag information associated with particular locations as the user moves through the physical space.

In an embodiment, the camera-enabled device stores path data (Operation 218). Specifically, the camera-enabled device may store a record of a path traveled by the camera-enabled device through the physical space. The camera-enabled device may determine the path traveled relative to a calibration point. When a user tags a location in the physical space, the camera-enabled device may associate, in the path data and/or the plan data, the tag with the particular path traveled. The tag information may include a timestamp that associates the tag with a particular path traveled. To record the path traveled, the camera-enabled device may transform data representing the path, based on a relationship between an actual scale of the physical space and a reduced scale of the plan. The camera-enabled device may store the transformed path representation.

3.2 Tagging a Physical Location

Figure 3:
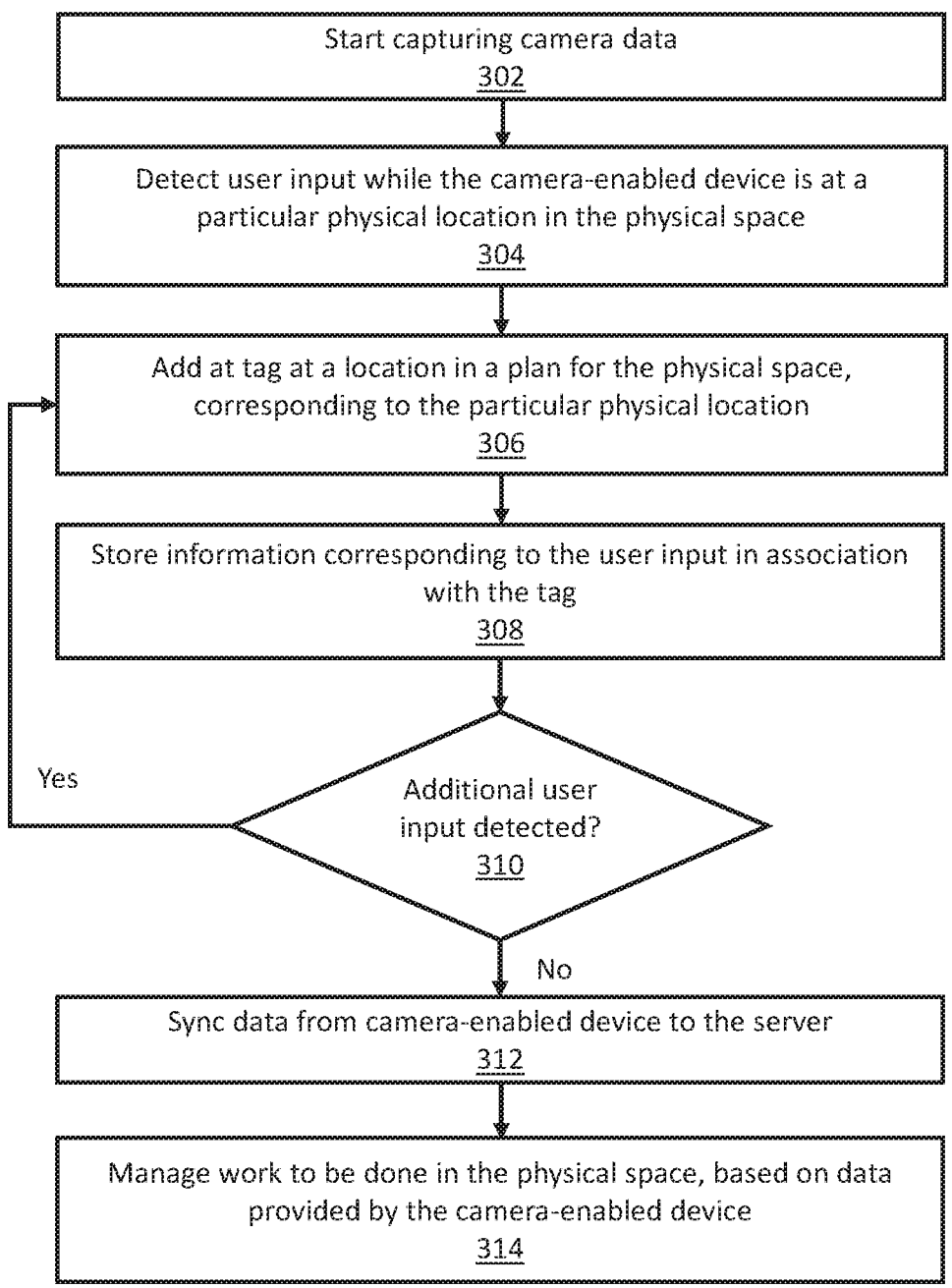

FIG. 3 illustrates an example set of operations for real-time location tagging in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, a camera-enabled device starts capturing camera data (Operation 302) in a physical space. For example, the camera-enabled device may start capturing camera data as described with respect to Operations 202-210 of FIG. 2, above.

In an embodiment, the camera-enabled device detects user input while the camera-enabled device is at a particular physical location in a physical space (Operation 304). The user input may take many different forms. For example, the camera-enabled device may include a microphone and the user may supply audio data (e.g., speech) via the microphone. As another example, a user may type text via a physical or virtual keyboard. Some embodiments may be implemented without using a camera-enabled device, or using a camera-enabled device without capturing camera data, as long as the device is able to determine its location in the physical space. Thus, in some embodiments that do not rely on camera data, references herein to a "camera-enabled device" may be treated as references to a "device," regardless of whether or not the device is camera-enabled.

In an embodiment, responsive to the user input, the camera-enabled device adds a tag at a location in a plan for the physical space, corresponding to the particular physical location (Operation 306). The camera-enabled device may determine the location for the tag in many different ways. In an embodiment, the location is assumed to be a predetermined fixed distance (e.g., three feet) in front of the camera-enabled device. Alternatively, the camera-enabled device may perform surface detection to determine a distance to a physical surface being captured. Alternatively, the location may be the location of the camera-enabled device itself. Alternatively, the camera-enabled device may cross-reference plan metadata to determine a best match for the location. For example, the camera-enabled device may be located three feet in front of a door and oriented toward the door. By cross-referencing the plan metadata, the camera-enabled device may select the door's known location as a best match for the location. The location in the plan metadata may represent a refinement over a location that would have been used in the absence of plan metadata.

In an embodiment, the camera-enabled device stores information, corresponding to the user input, in association with the tag (Operation 308). The user input may include audio data, text data, photo data, or any other kind of data or combination thereof provided by the user. In an embodiment, the camera-enabled device captures audio data and performs voice recognition to generate text that is included in the tag information. Alternatively or in addition, tag information may include, for example: a user to whom work (i.e., one or more tasks associated with the tag) is assigned (a.k.a. "assignee"); a user who has access to review the status of the work, and/or who may receive notifications regarding the status of the work (a.k.a. "watcher"); a due date associated with the work; a location (e.g. room number) associated with the work; a category of work (e.g., "cleaning," "electrical," or some other category or combination thereof); a description of the work; general observations regarding the work and/or location; documentation related to the work and/or location; a cost impact associated with the work; a schedule impact associated with the work; or any other kind of information associated with the work and/or location; or combination thereof.

In an embodiment, in addition to the user input, the camera-enabled device may store other information associated with the tagged location. The additional information may be based on plan metadata associated with the tagged location. For example, if the tagged location corresponds to a particular physical feature for which plan metadata is available, the camera-enabled device may include some or all of the corresponding plan metadata in the tag information. Alternatively or in addition, the additional information may be based on image recognition. For example, the camera-enabled device may perform image recognition on an image (i.e., a photograph or video frame) of the location. If the image recognition is able to determine a type of physical feature shown in the image, then the camera-enabled device may include information about that type of physical feature in the tag information. Alternatively or in addition, a user may select, via a user interface of the camera-enabled device, a category of work to be done at the location. A marker associated with the tag information may include text and/or one or more symbols based on the category of work. For example, a marker with the acronym "CN" may correspond to a category of work "cleaning needed."

In an embodiment, the camera-enabled device continues tagging locations as the camera-enabled device moves through the physical space. Specifically, the camera-enabled device may determine whether additional user input is detected (Operation 310) at another location in the physical space. If additional user input is detected, then the camera-enabled device proceeds to add another tag at that location (Operation 306).

In an embodiment, the camera-enabled device syncs data from the camera-enabled device to the server (Operation 312). Specifically, the camera-enabled device may sync tag information to the server. Alternatively or in addition, the camera-enabled device may sync path data to the server. In an embodiment, the camera-enabled device syncs data to the server periodically, at regular time intervals. Alternatively or in addition, the camera-enabled device may sync data to the server according to an event-driven model such as when a tag is added, modified, or deleted. Alternatively or in addition, the camera-enabled device may sync data to the server when instructed to do so by a user.

In an embodiment, a user manages work to be done in the physical space, based on data provided by the camera-enabled device (Operation 314). Specifically, the user may manage the work via a user interface of a management device (e.g., management device 126 of FIG. 1). To manage the work, the user may access a visual representation of a plan of the physical space. The visual representation may include markers corresponding to tag information entered via the camera-enabled device. Alternatively or in addition, the visual representation may include markers and/or one or more other graphical indicators corresponding to one or more paths traveled, by one or more camera-enabled devices, in the physical space. The user may select a marker to view the corresponding tag information, details regarding the path traveled, etc. The user may be able to add a tag, edit an existing tag, and/or delete an existing tag. In an embodiment, the user performs an audit of the work to be done in the physical space. Managing the work to be done may include, for example: confirming that a path traveled by the camera-enabled device corresponds to an expected path, such as a path expected to be traveled by a maintenance worker; confirming that work was completed, such as punch list items in a construction project; reviewing the status of work remaining to be completed (e.g., numbers and types of tasks, due dates, overdue tasks, takes of particular types, etc.); or any other kind of management task or combination thereof. In an embodiment, changes made to tag information via a management device are synced to the server. Any other devices that subsequently sync with the server will then receive updated data reflecting those changes.

3.3 Tagging with Image Recognition

Figure 4:
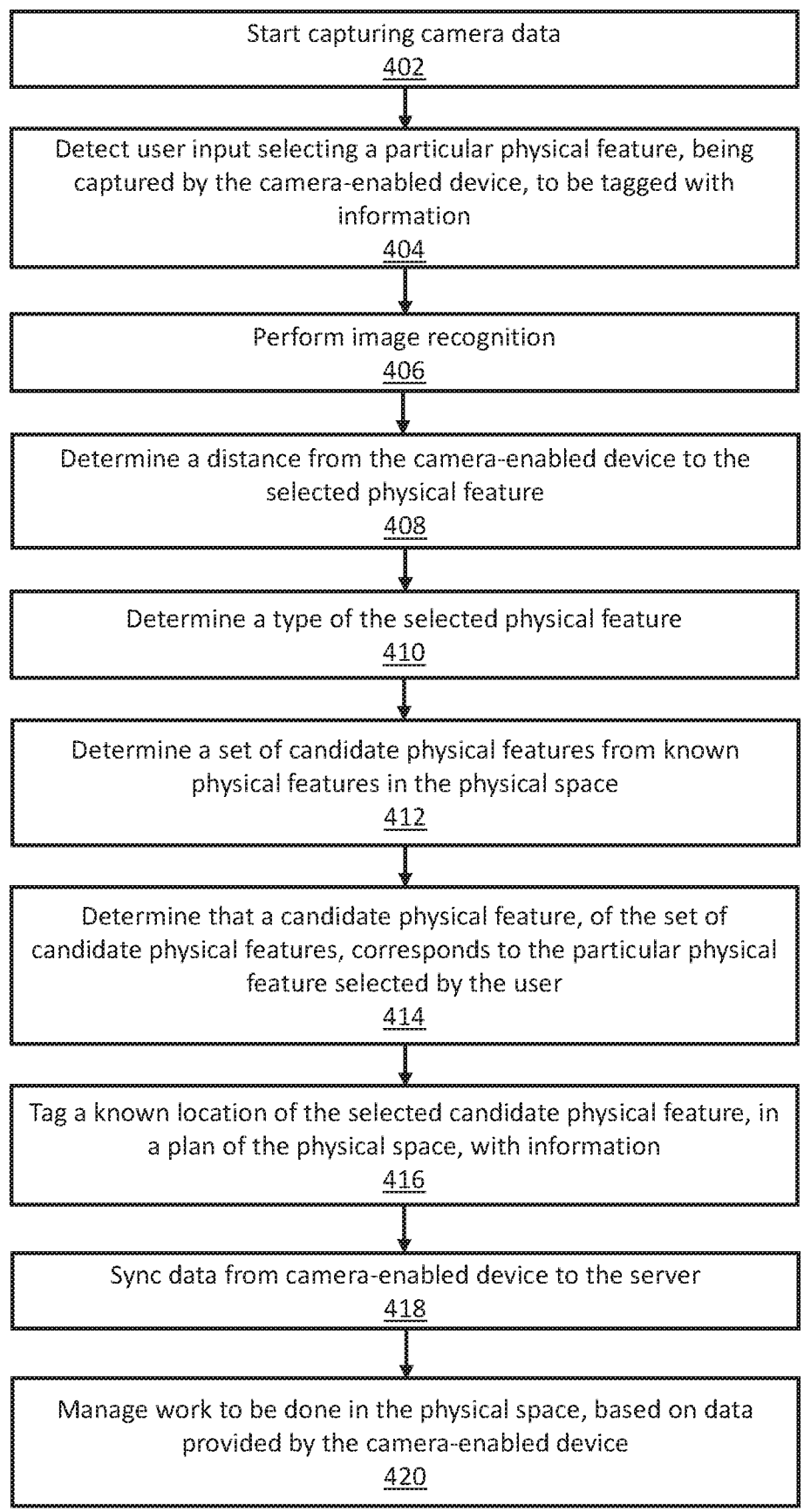

FIG. 4 illustrates an example set of operations for real-time location tagging in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, a camera-enabled device starts capturing camera data (Operation 402) in a physical space. For example, the camera-enabled device may start capturing camera data as described with respect to Operations 202-210 of FIG. 2, above.

In an embodiment, the camera-enabled device detects user input selecting a particular physical feature, being captured by the camera-enabled device, to be tagged with information (Operation 404). For example, a user may select or 'tap' a touchscreen that is displaying an image (i.e., a photograph or video frame) of the particular physical feature. The user input may indicate a particular area of the image where the physical feature is being displayed.

In an embodiment, responsive to the user input, the camera-enabled device performs image recognition on the image (Operation 406). Based on the image recognition, the camera-enabled device may determine a distance from the camera-enabled device to the selected physical feature (Operation 408). Alternatively, the camera-enabled device may assume that the physical feature is a particular distance (e.g., three feet or some other predetermined distance) from the camera-enabled device. In addition, based on the image recognition, the camera-enabled device may determine a type of the selected physical feature (Operation 410). The image recognition may apply deep learning techniques, or some other kind of image classification technique, to determine a type of physical feature shown in the image. For example, based on image recognition, the camera-enabled device may be able to distinguish between walls, doors, tables, pipes, windows, or any other kind of physical feature or combination thereof. Alternatively, a user may supply input indicating what type of physical feature was selected. For example, the camera-enabled device may present a drop-down menu of types of physical features, and the user may select a type of physical feature from the drop-down menu. The camera-enabled device may determine the type of physical feature in many different ways.

In an embodiment, based on the type of physical feature selected, the camera-enabled device determines a set of candidate physical features from known physical features in the physical space (Operation 412). To determine the set of candidate physical features, the camera-enabled device may cross-reference the type of the selected physical feature with plan metadata, to determine a set of known physical features of that same type. When cross-referencing the plan metadata, the camera-enabled device may include a constraint based on a location of the camera-enabled device, to obtain a set of candidate physical features that are near the camera-enabled device's current location. For example, a user may select a door that is currently being captured and displayed by a camera-enabled device. Upon determining that the selected physical feature is a door, the camera-enabled device may cross-reference plan metadata to determine a set of doors that are known to be present in the physical space, according to the plan metadata. The set of doors may be limited to those that are within a particular distance of the camera-enabled device.

In an embodiment, having determined a set of candidate physical features, the camera-enabled device determines that a candidate physical feature, from the set of candidate physical features, corresponds to the particular physical feature selected by the user (Operation 414). The camera-enabled device may select the candidate physical feature based on the distance between (a) the camera-enabled device and the selected physical feature, and (b) the type of selected physical feature. Continuing with the example above, the camera-enabled device may determine that the user selected a door located two meters in front of the camera-enabled device. Of the set of known doors in the physical space, only one door matches that particular location. The camera-enabled device determines that the matching door corresponds to the physical feature selected by the user.

In an embodiment, the camera-enabled device tags a known location of the selected candidate physical feature, in a plan of the physical space, with information (Operation 416). Example operations for adding a tag and storing tag information for a particular location are discussed above with respect to Operations 306 and 308 of FIG. 3. The location associated with the tag information is the known location, from the plan metadata, of the known physical feature that the camera-enabled device determined to be a match for the selected physical feature. In addition, the camera-enabled device may confirm that the tag information is appropriate for the type of physical feature selected. For example, it would be appropriate for a user to tag a wall as needing grout, but it would not be appropriate for a user to tag a television as needing grout. The camera-enabled device may alert a user if the tag information is not appropriate for the selected physical feature, and/or may filter a set of available tagging options based on the type of physical feature.

In an embodiment, the camera-enabled device syncs data from the camera-enabled device to the server (Operation 418). Example operations for syncing data are discussed above with respect to Operation 312 of FIG. 3. In an embodiment, a user manages work to be done in the physical space, based on data provided by the camera-enabled device (Operation 420). Example operations for managing work to be done in a physical space are discussed above with respect to Operation 314 of FIG. 3.

In an embodiment, operations described herein for tagging locations may be thought of as "real-time" because they are performed as the camera-enabled device is moving through the physical space, rather than at some later time. Real-time location tatting may help workers to record and track observations in a physical space, ensuring that those observations are recorded as tag information associated with the correct locations in the physical space as reflected on a plan. Reliable association of tag information with locations may reduce the frequency and/or severity of mistakes made when working in a physical space, resulting in the work costing less time and/or money to perform. Syncing tag information to and from a server and other devices helps ensure that workers have access to the same tag information, without requiring access to a particular physical copy of a plan. Syncing data in this manner may improve a team's efficacy, reduce the frequency and/or severity of mistakes, and save time and/or money incurred while performing the work. Alternatively or in addition, real-time location tagging may save time needed to perform tagging, relative to attempting to tag locations with information at some later time. Alternatively or in addition, recording a path traveled by a camera-enabled device, with or without associated location tagging, may help project managers and/or supervisors establish an audit trail of the path, helping to ensure that observations and quality issues are recorded in an expected manner.

4. Illustrative Examples

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 5:
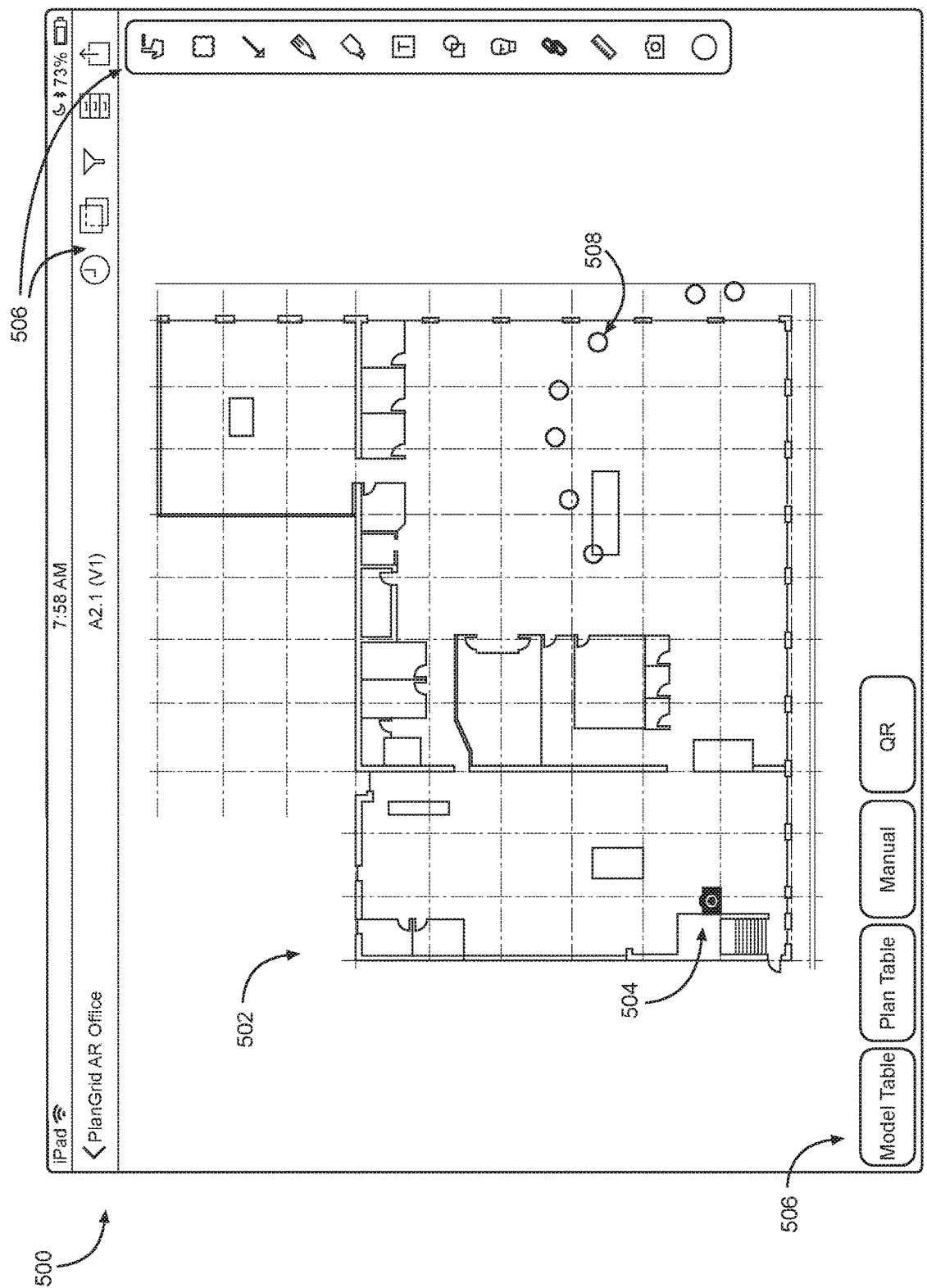
FIGS. 5-9 illustrate examples of user interfaces in accordance with one or more embodiments.

FIG. 5 illustrates an example of a user interface 500 in accordance with an embodiment. The user interface 500 includes a plan 502 that represents various physical features of a physical space. In this example, the physical features include walls, doors, windows, furniture, stairs, etc. In addition, the user interface includes an icon 504 that represents the current location of the camera-enabled device that is displaying the user interface 500. Markers 508 indicate locations in the physical space for which tag information is available. In this example, some of the markers follow an are that corresponds to a path traveled by the camera-enabled device. Other markers may have been entered manually via the user interface 500, using the camera-enabled device or a management device. User interface controls 506 are selectable by a user to initiate various functions of the camera-enabled device, such as selecting markers, filtering markers by various criteria, moving markers, drawing on the plan (e.g., shapes, text, or any other symbol or combination thereof), taking a screenshot, calibrating a location and orientation of the camera-enabled device, comparing various versions of a plan, selecting different plans for tagging and/or management, viewing lists and/or other representations of construction data (e.g. documents, tasks, etc.), or any other kind of task associated with a plan and/or tagging, or combination thereof.

Figure 6:
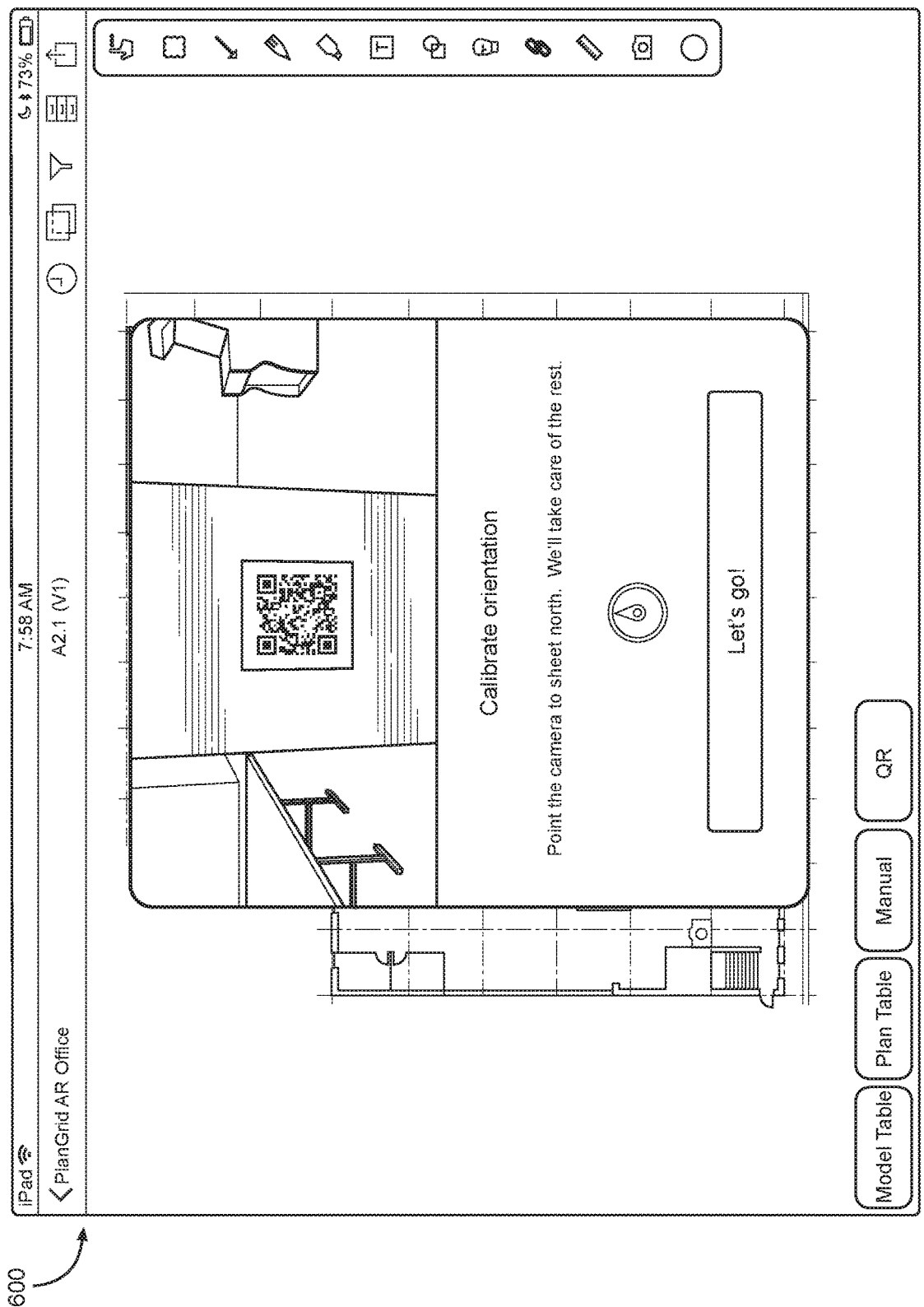

FIG. 6 illustrates an example of a user interface 600 that is presented when a user is calibrating the location and orientation of the camera-enabled device. In this example, the camera-enabled device is capturing, via a camera lens, a QR code attached to an upright beam in the physical space. In the upper left-hand corner, the user interface 600 includes a heads-up display with a miniature version of the plan. A user may select a user interface control ("Let's go!") to initiate calibration. As noted above, when a QR code or other physical anchor is used, calibration of both the location and orientation of the physical anchor may be based on the known location and orientation of the physical anchor.

Figure 7:
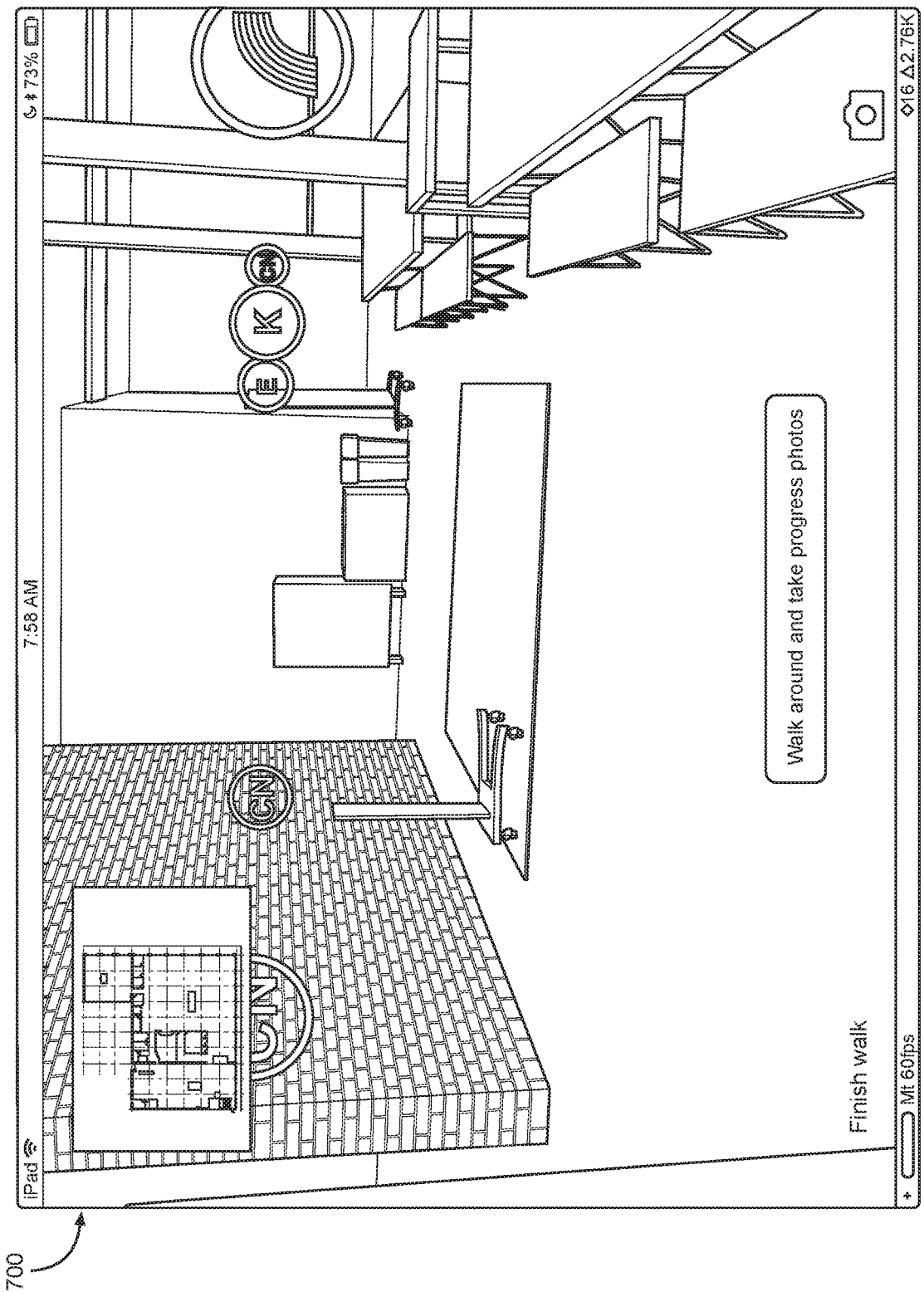
Figure 8:
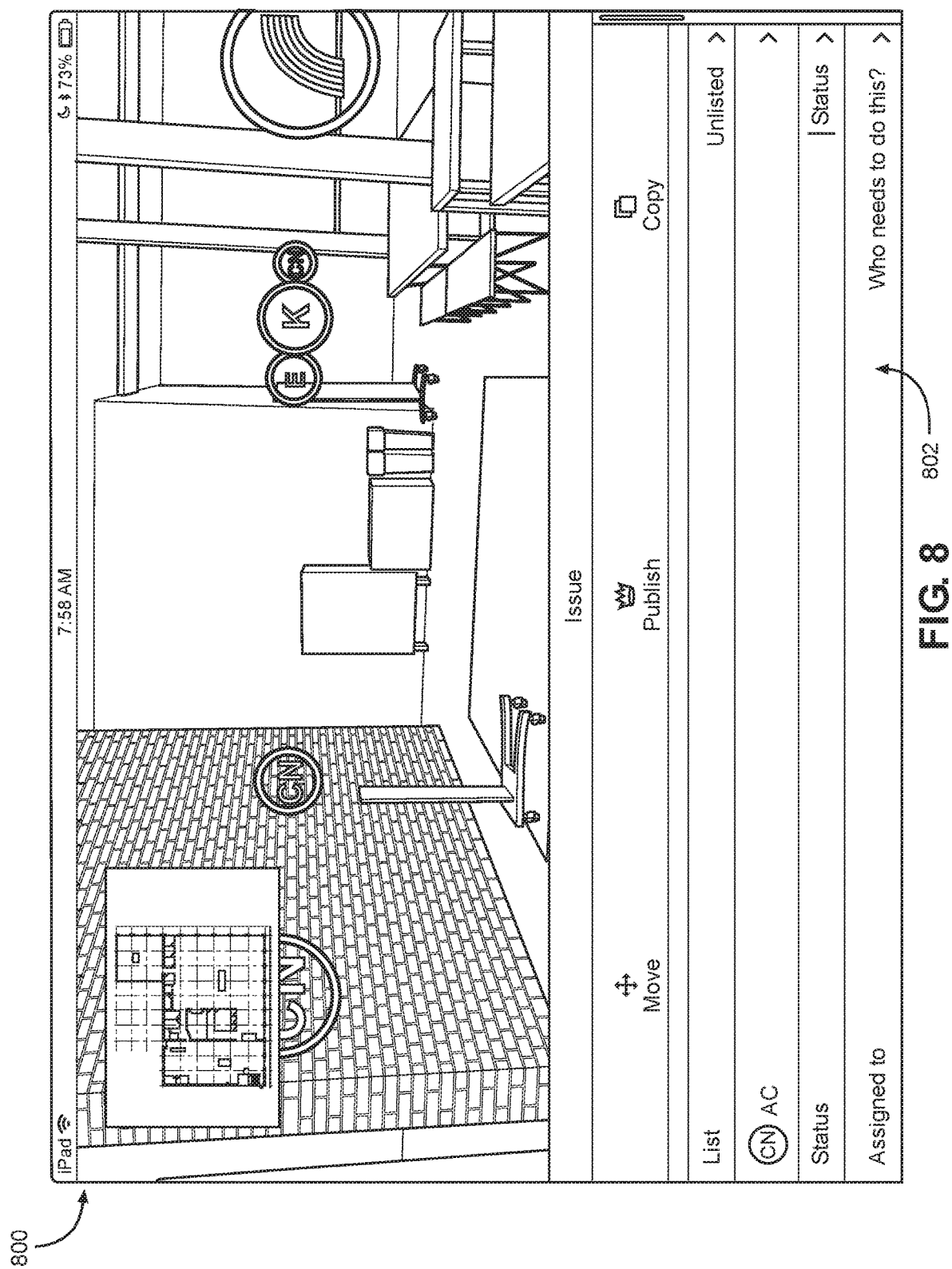
Figure 9:
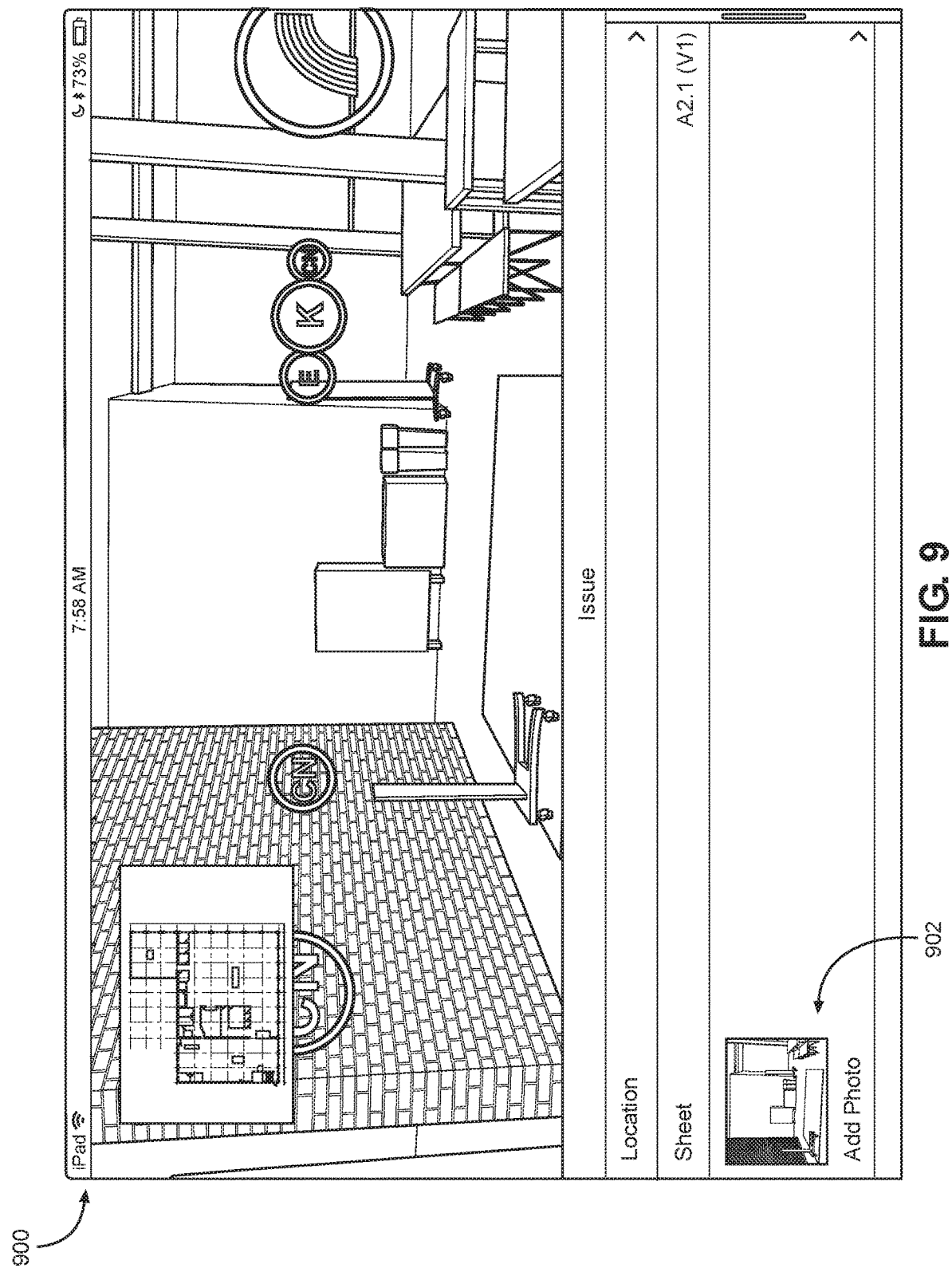

FIG. 7 illustrates an example of a user interface 700, in which a camera-enabled device displays markers overlaid on camera data being captured by the camera-enabled device. In this example, the markers are presented as floating circles with internal symbols ("CN", "E", "K." rainbow, etc.). If the display is a touchscreen, a user may be able to tap on a particular marker to interact with the tag information associated with that marker. In the user interface 800 of FIG. 8, a user has selected a particular marker and has various options for modifying the marker and/or associated tag information 802. For example, the user may move the marker to a different location, publish the tag information (i.e., sync the data to the server), or copy the marker. In addition, a user may add, modify, or delete tag information. In this example, tag information includes a list (e.g., a task list) with which the tag information is associated, a symbol to be used for the marker, a status of work to be done at that location, and a user to whom the work is assigned. In the user interface of FIG. 900, the user has scrolled down to interact with additional tag information that includes details of the location of tag, a label corresponding to the plan with which the tag is associated. In addition, the user interface 900 allows the user to include multimedia data 902 in the tag information, such as a photograph, video, audio data, etc.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
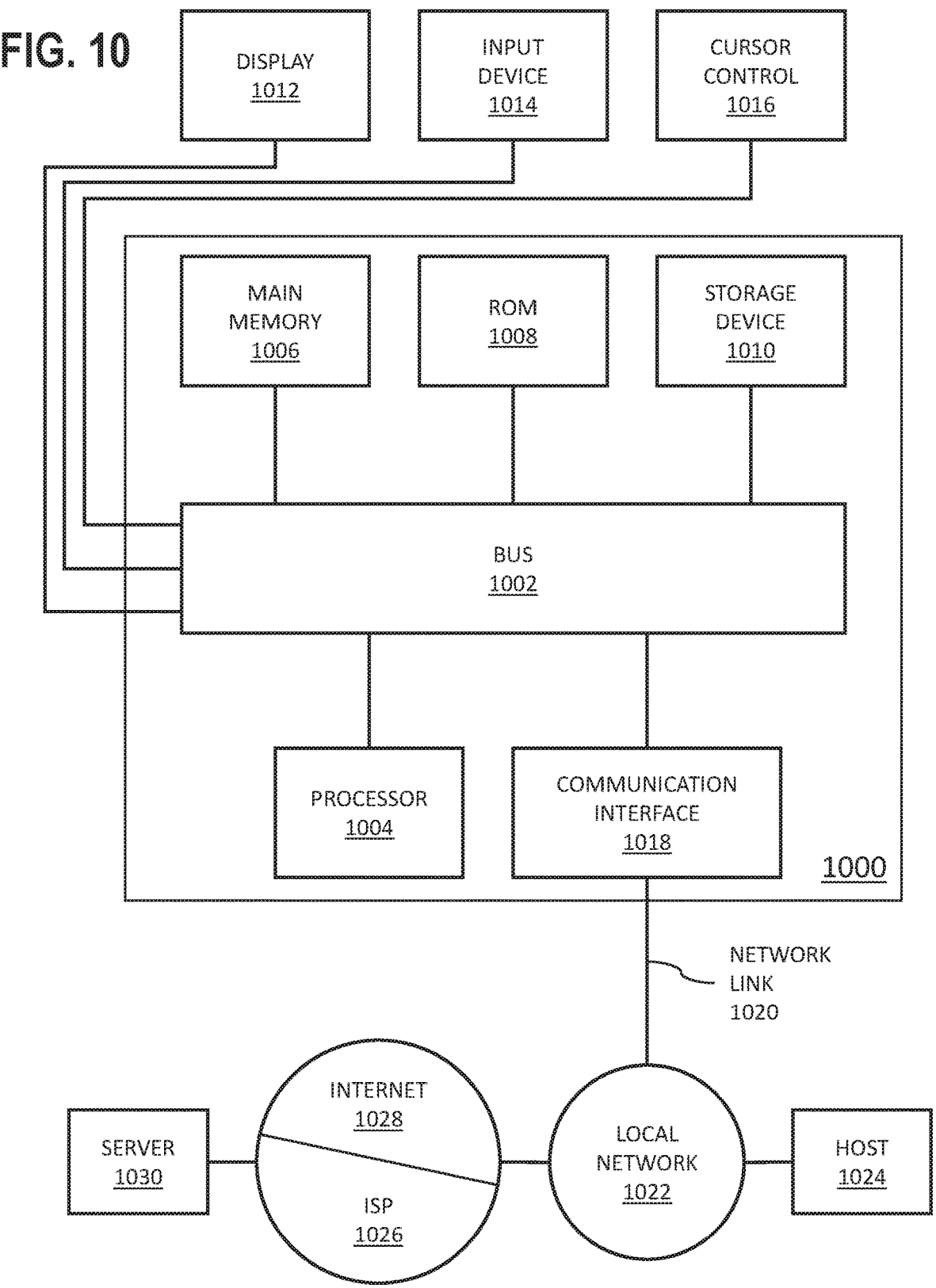
FIG. 10 shows a block diagram that illustrates a computer system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a liquid crystal display (LCD), plasma display, electronic ink display, cathode ray tube (CRT) monitor, or any other kind of device for displaying information to a computer user. An input device 1014, including alphanumeric and other keys, may be coupled to bus 1002 for communicating information and command selections to processor 1004. Alternatively or in addition, the computer system 1000 may receive user input via a cursor control 1016, such as a mouse, a trackball, a trackpad, a touchscreen, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. The display 1012 may be configured to receive user input via one or more pressure-sensitive sensors, multi-touch sensors, and/or gesture sensors. Alternatively or in addition, the computer system 1000 may receive user input via a microphone, video camera, and/or some other kind of user input device (not shown).

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 1000 can receive the data from the network and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

7. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements. Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   (a) presenting, on a camera-enabled device, an image of a physical space currently being captured by the camera-enabled device;
   (b) responsive to detecting user input, on the camera-enabled device, while the image of the physical space is being captured by the camera-enabled device:
      (i) tagging, on the camera-enabled device in real time with detecting the user input, a location in a plan of the physical space with information based at least in part on the user input;
      (ii) determining that the user input is associated with a selected physical feature in the image;
      (iii) determining a feature location corresponding to the physical feature, based at least in part on a location of the camera-enabled device and a distance of the selected physical feature from the camera-enabled device, wherein the determining the feature location comprises:
(1) determining a type of the selected physical feature;
(2) analyzing metadata associated with the plan to identify known physical features, of the type of the selected physical features, as a set of candidate physical features;
(3) selecting a candidate physical feature from the set of candidate physical features, based on the location of the camera-enabled device and the distance of the selected physical feature from the camera-enabled device;
(4) determining a known location of the candidate physical feature in the plan of the physical space; and
(5) selecting the known location of the candidate physical feature as the location of the selected physical feature; and
(iv) using the feature location as the location in the plan of the physical space.

2. The medium of claim 1, the operations further comprising:
cross-referencing the location with architectural metadata associated with the location.

3. The medium of claim 2, the operations further comprising:
refining the location based at least in part on the architectural metadata.

4. The medium of claim 2, the operations further comprising:
populating at least a portion of the information based on the architectural metadata.

5. The medium of claim 1, the operations further comprising:
applying an image recognition process to the image;
based on the image recognition process: populating at least a portion of the information.

6. The medium of claim 1, wherein the information comprises a category of work to be performed at the location.

7. The medium of claim 6, the operations further comprising:
syncing the information to a separate device that is separate from the camera-enabled device;
based at least in part on the information: managing, via the separate device, work to be performed at the location.

8. The medium of claim 1, the operations further comprising:
recording the location as a point along a traveled path in the physical space.

9. The medium of claim 8, wherein recording the location is performed relative to a calibration point associated with the traveled path.

10. The medium of claim 9, wherein the calibration point is associated with a visual anchor, the operations further comprising:
calibrating the camera-enabled device relative to the calibration point, at least by capturing the visual anchor via the camera-enabled device.

11. The medium of claim 8, wherein the path is associated with a plurality of timestamps, such that a plurality of timestamps indicate a direction and times at which the traveled path was traveled.

12. The medium of claim 8, the operations further comprising:
based at least in part on the traveled path: performing an audit of work to be performed in the physical space.

13. The medium of claim 8, the operations further comprising:
based at least in part on a relationship between an actual scale of the physical space and a reduced scale of the plan:
transforming data that represents the traveled path, to obtain a transformed path representation;
storing the transformed path representation in association with the plan.

14. The medium of claim 1, the operations further comprising:
responsive to detecting that the location is being captured by a separate camera-enabled device: overlaying at least a portion of the information in a display of the separate camera-enabled device.

15. The medium of claim 1, wherein the information comprises user-provided audio input.

16. The medium of claim 1, wherein the information comprises user-provided text input.

17. A system comprising:
(a) at least one camera-enabled device including a hardware processor;
(b) the system being configured to perform operations comprising:
(i) presenting an image of a physical space currently being captured by the camera-enabled device;
(ii) responsive to detecting user input, on the camera-enabled device, while the image of the physical space is being captured by the camera-enabled device:
(1) tagging, on the camera-enabled device in real time with detecting the user input, a location in a plan of the physical space with information based at least in part on the user input;
(2) determining that the user input is associated with a selected physical feature in the image;
(3) determining a feature location corresponding to the physical feature, based at least in part on a location of the camera-enabled device and a distance of the selected physical feature from the camera-enabled device, wherein the determining the feature location comprises:
(A) determining a type of the selected physical feature;
(B) analyzing metadata associated with the plan to identify known physical features, of the type of the selected physical features, as a set of candidate physical features;
(C) selecting a candidate physical feature from the set of candidate physical features, based on the location of the camera-enabled device and the distance of the selected physical feature from the camera-enabled device;
(D) determining a known location of the candidate physical feature in the plan of the physical space; and
(E) selecting the known location of the candidate physical feature as the location of the selected physical feature; and
(4) using the feature location as the location in the plan of the physical space.

18. A method comprising:
(a) presenting, on a camera-enabled device, an image of a physical space currently being captured by the camera-enabled device;
(b) responsive to detecting user input, on the camera-enabled device, while the image of the physical space is being captured by the camera-enabled device:
   (i) tagging, on the camera-enabled device in real time with detecting the user input, a location in a plan of the physical space with information based at least in part on the user input, wherein the method is performed by at least one device comprising a hardware processor
   (ii) determining that the user input is associated with a selected physical feature in the image;
   (iii) determining a feature location corresponding to the physical feature, based at least in part on a location of the camera-enabled device and a distance of the selected physical feature from the camera-enabled device, wherein the determining the feature location comprises:
      (1) determining a type of the selected physical feature;
      (2) analyzing metadata associated with the plan to identify known physical features, of the type of the selected physical features, as a set of candidate physical features;
      (3) selecting a candidate physical feature from the set of candidate physical features, based on the location of the camera-enabled device and the distance of the selected physical feature from the camera-enabled device;
      (4) determining a known location of the candidate physical feature in the plan of the physical space; and
      (5) selecting the known location of the candidate physical feature as the location of the selected physical feature; and
   (iv) using the feature location as the location in the plan of the physical space.

\* \* \* \* \*